(12) United States Patent
Reese et al.

(10) Patent No.: US 9,152,822 B2
(45) Date of Patent: *Oct. 6, 2015

(54) METHOD AND APPARATUS FOR SECURING PROGRAMMING DATA OF A PROGRAMMABLE DEVICE

(71) Applicant: Altera Corporation, San Jose, CA (US)

(72) Inventors: Dirk A. Reese, Campbell, CA (US); JuJu Joyce, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/092,119

(22) Filed: Nov. 27, 2013

(65) Prior Publication Data

US 2014/0089677 A1    Mar. 27, 2014

Related U.S. Application Data

(63) Continuation of application No. 13/097,205, filed on Apr. 29, 2011, now Pat. No. 8,627,105.

(51) Int. Cl.
*H04L 29/06* (2006.01)
*G06F 21/76* (2013.01)

(52) U.S. Cl.
CPC ........................................ *G06F 21/76* (2013.01)

(58) Field of Classification Search
CPC ........................................................ G06F 21/76
See application file for complete search history.

(56) References Cited

U.S. PATENT DOCUMENTS

| 4,609,986 | A | 9/1986 | Hartmann et al. |
| 4,617,479 | A | 10/1986 | Hartmann et al. |
| 4,677,318 | A | 6/1987 | Veenstra |
| 4,713,792 | A | 12/1987 | Hartmann et al. |
| 4,774,421 | A | 9/1988 | Hartmann et al. |
| 4,871,930 | A | 10/1989 | Wong et al. |
| 4,899,067 | A | 2/1990 | So et al. |
| 4,912,342 | A | 3/1990 | Wong et al. |
| 5,033,084 | A | 7/1991 | Beecher |
| 5,081,675 | A | 1/1992 | Kittirutsunetorn |
| 5,121,006 | A | 6/1992 | Pedersen |

(Continued)

OTHER PUBLICATIONS

Minnick, R.C., "A Survey of Microcellular Research" *Journal of the Association for Computing Machinery*, vol. 14, No. 2, pp. 203-241 (Apr. 1967).

(Continued)

*Primary Examiner* — Justin T Darrow

(74) *Attorney, Agent, or Firm* — Ropes & Gray LLP; Jeffrey H. Ingerman

(57) ABSTRACT

Configuration data for a programmable integrated circuit device is at least partially encrypted according to at least one encryption scheme. A plurality of key stores store a plurality of decryption keys for the at least one encryption scheme. Control circuitry identifies a required key from the at least partially encrypted configuration data and generates a key selection signal. Key selection circuitry responsive to the key selection signal reads the plurality of key stores and provides the required key to the control circuitry. The control circuitry may include decryption circuitry that decrypts the at least partially encrypted configuration data using the required key. In some embodiments, different portions of the configuration data, which may represent separate partial reconfigurations of the device, require different decryption keys. Keys may be generated from combinations of the contents of the key stores.

22 Claims, 3 Drawing Sheets

(56) References Cited

U.S. PATENT DOCUMENTS

| | | |
|---|---|---|
| 5,220,214 A | 6/1993 | Pedersen |
| 5,260,610 A | 11/1993 | Pedersen et al. |
| 5,260,611 A | 11/1993 | Cliff et al. |
| 5,350,954 A | 9/1994 | Patel |
| 5,371,422 A | 12/1994 | Patel et al. |
| 5,388,157 A | 2/1995 | Austin |
| 5,450,022 A | 9/1995 | New |
| 5,479,512 A | 12/1995 | Weiss |
| 5,513,262 A | 4/1996 | Van Rumpt et al. |
| 5,548,228 A | 8/1996 | Madurawe |
| 5,563,592 A | 10/1996 | Cliff et al. |
| 5,581,198 A | 12/1996 | Trimberger |
| 5,636,281 A | 6/1997 | Antonini |
| 5,768,372 A | 6/1998 | Sung et al. |
| 5,915,017 A | 6/1999 | Sung et al. |
| 6,172,520 B1 | 1/2001 | Lawman et al. |
| 6,904,527 B1 | 6/2005 | Parlour et al. |
| 6,931,543 B1 | 8/2005 | Pang et al. |
| 7,058,177 B1 | 6/2006 | Trimberger et al. |
| 7,117,373 B1 | 10/2006 | Trimberger et al. |
| 7,162,644 B1 | 1/2007 | Trimberger |
| 7,550,324 B1 | 6/2009 | Walstrum et al. |
| 7,675,313 B1 | 3/2010 | Tang et al. |
| 7,716,497 B1 | 5/2010 | Trimberger |
| 2001/0015919 A1 | 8/2001 | Kean |
| 2001/0032318 A1 | 10/2001 | Yip et al. |
| 2006/0209584 A1 | 9/2006 | Devadas et al. |
| 2007/0074045 A1 | 3/2007 | Van Essen et al. |

OTHER PUBLICATIONS

Wahlstrom, S.E., "Programmable logic arrays—cheaper by the millions," *Electronics*, pp. 90-95 (Dec. 11, 1967).

Mukhopadhyay, A., *Recent Developments in Switching Theory*, Academic Press, New York, Chapters VI and IX, pp. 229-254 and 369-422 (1971).

METHOD AND APPARATUS FOR SECURING PROGRAMMING DATA OF A PROGRAMMABLE DEVICE

CROSS REFERENCE TO RELATED APPLICATION

This is a continuation of copending, commonly-assigned U.S. patent application Ser. No. 13/097,205, filed Apr. 29, 2011, now U.S. Pat. No. 8,627,105, which is hereby incorporated by reference herein in its entirety.

BACKGROUND OF THE INVENTION

This invention relates to a method and an apparatus for securing the programming data of a programmable device—e.g., a field-programmable gate array (FPGA) or other programmable logic device (PLD)—against copying, and to a programmable device so secured.

Programmable devices are well known. In one class of known PLDs, each device has a large number of logic gates, and a user programs the device to assume a particular configuration of those logic gates, frequently using a software tool provided by the manufacturer of the device, with the software tool being executed on a computer having an adapter into which the device is inserted. Early generations of such devices typically used some form of programmable read-only memory ("PROM") technology to store the configuration data produced by the software tool. In those early devices, the software tool caused the computer to "burn" the pattern into the PROM storage by fusing fusible links. In later generations, the PROM technology may have been erasable programmable read-only memory ("EPROM") technology, which was not burned, and could be erased (for reprogramming) by exposure to ultraviolet light. Still later generations may have used electrically erasable programmable read-only memory ("EEPROM" or "E$^2$PROM") technology.

All of those technologies were relatively secure. In the case of a user who chose to use a programmable logic device rather than incur the effort and expense of a developing a custom chip, if a competitor of that user were to try to reverse engineer the programmed programmable logic device, the competitor would essentially have to slice the device layer by layer to discern its programming. While such an effort might be technically feasible, for the types of users being discussed, who by definition are not chip manufacturers, the likelihood that a competitor could or would undertake the effort was small.

Later, programmable logic devices that store their configuration data in static random access memory ("SRAM") storage became available and remain prevalent. Such devices have the advantage of being smaller and faster than the devices based on EPROM technology.

However, SRAM storage is volatile; it does not retain its contents when power is lost. Therefore, programmable logic devices based on SRAM technology are used with nonvolatile storage, to retain the configuration programming data during times that the device is switched off or otherwise not provided with power. Such nonvolatile storage may be provided, for example, in the form of Flash memory, although any form of nonvolatile storage may be used, and it may be either on, or separate from, the device.

Whatever type of nonvolatile storage is used, an SRAM programmable logic device having nonvolatile storage of its configuration data is less secure against reverse engineering by a competitor of its user. That is because a competitor can monitor the data flowing out of the nonvolatile storage on power-up, and thereby determine the programming configuration of the programmable logic device. Indeed, the competitor need not even analyze the data stream, but need only record it and store it in its own devices.

Commonly-assigned U.S. Pat. Nos. 5,768,372 and 5,915,017, each of which is hereby incorporated by reference herein in its respective entirety, describe the encryption of the configuration data stored in the nonvolatile storage and its decryption upon loading into the programmable device, including provision of an indicator to signal to the decryption circuit which of several possible encryption/decryption schemes was used to encrypt the configuration data and therefore should be used to decrypt the configuration data.

Subsequently, the programmable device market has become more sophisticated. Previously a device manufacturer would sell blank programmable devices to an original customer who typically would program them and sell each device as part of an end-user product. Thus, the manufacturer's original customer typically was the only party providing configuration data and therefore the only party needing to protect configuration data. More recently, vendor-provided proprietary configuration data for various commonly-used functions (frequently referred to as "intellectual property cores") have been sold either by device manufacturers or third parties, freeing the original customer from having to program those functions on its own. If a party provides such proprietary configuration data, it may want to protect those data from being read, but the original customer needs to be free to add additional proprietary configuration data from another vendor (which also will want to protect its proprietary configuration data), as well as its own configuration data, and then to protect the final configuration including its own configuration data and any vendor-provided configuration data.

SUMMARY OF THE INVENTION

The present invention relates to circuitry and methods for separately protecting different portions of configuration data of a programmable device using different encryptions (including the option of no encryption) and keys, as well as providing different keys and combinations of keys.

Therefore, in accordance with embodiments of the present invention, there is provided a programmable integrated circuit device having an input for configuration data for the programmable integrated circuit device. The configuration data is at least partially encrypted according to at least one encryption scheme. A plurality of key stores store a plurality of decryption keys for the at least one encryption scheme. Control circuitry identifies a required key from the at least partially encrypted configuration data and generates a key selection signal. Key selection circuitry responsive to the key selection signal reads the plurality of key stores and provides the required key to the control circuitry. The control circuitry may include decryption circuitry that decrypts the at least partially encrypted configuration data using the required key.

In accordance with additional embodiments of the present invention, the configuration data include a plurality of partial configuration data portions. Respective ones of the plurality of partial configuration data portions are encrypted and require respective decryption keys. The control circuitry identifies respective required keys from the configuration data and generates respective key selection signals. The key selection circuitry reads the plurality of key stores responsive to the respective key selection signal and provides those respective required keys to the control circuitry.

Methods of configuring and operating such programmable integrated circuit devices are also provided.

BRIEF DESCRIPTION OF THE DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION OF THE INVENTION

Figure 1:
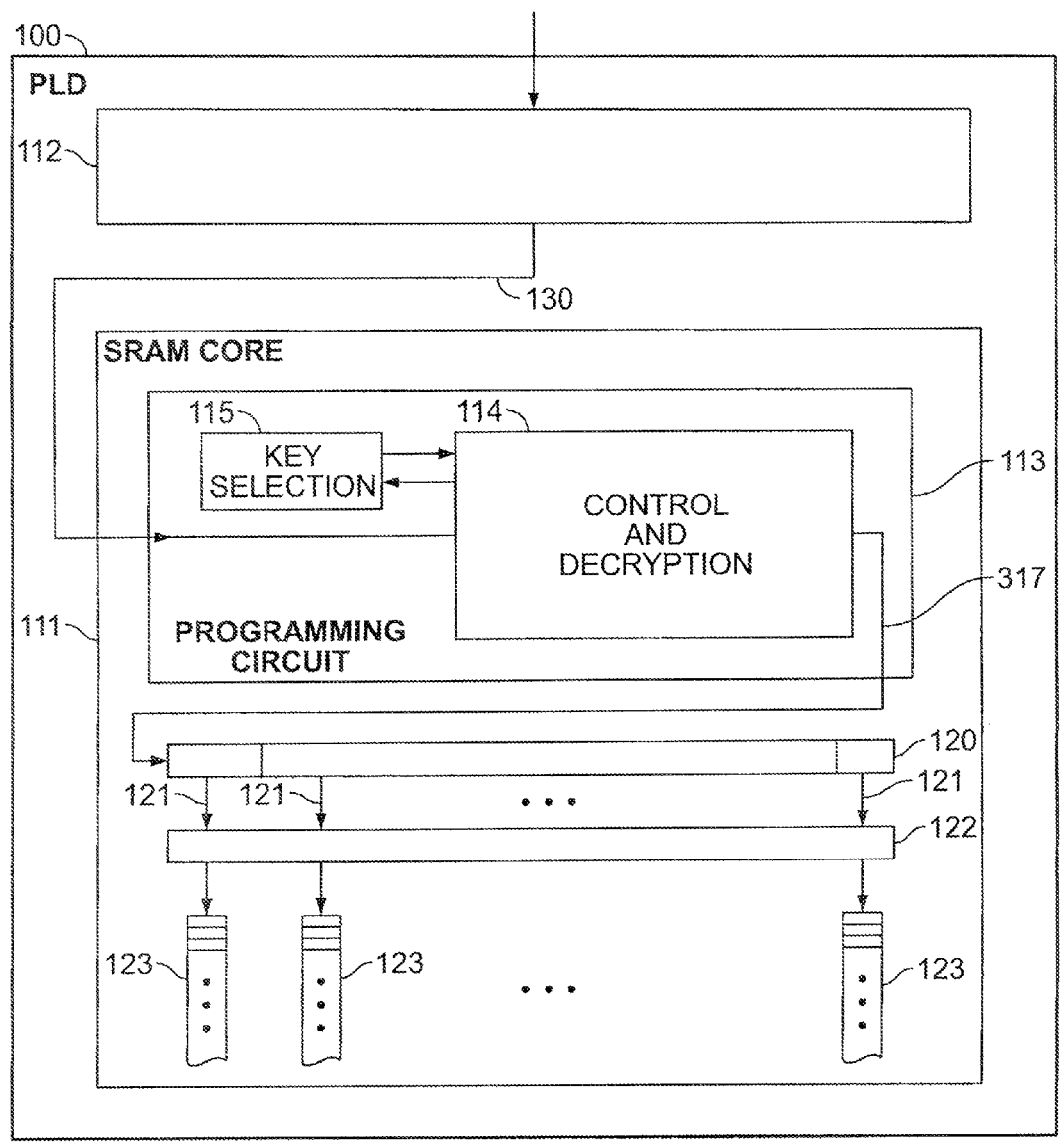
FIG. 1 is a block diagram of a programmable device in which the present invention may be implemented.

FIG. 1 shows a block diagram of a programmable logic device 100 as an example of a programmable device in which the present invention may be implemented. Programmable logic device 100 preferably includes nonvolatile storage 112 which stores the programming data, and an SRAM-based programmable logic core 111, having a programming circuit 113. SRAM-based programmable logic core 111 could be an FPGA, where nonvolatile storage 112 is on a separate die, which may be in a common package with core 111 or completely separate (and connected only by wires or traces). Alternatively, device 100 could be a type of PLD in which nonvolatile storage 112 and core 111 are on the same die.

If the configuration data were not encrypted, then when power would first be applied to programmable logic device 100, configuration data stored in nonvolatile storage 112 would be output over connection 130 to programmable logic core 111. The data preferably would be clocked serially into shift register chain 120. Preferably, when shift register chain 120 is filled, the data in shift register chain 120 would be transferred over connections 121 to buffer 122, whence they are transferred to "columns" 123 of SRAM programming registers which configure the logic structure of programmable logic core 111. As data in buffer 122 are being transferred to columns 123, configuration data preferably would continue to be clocked into shift register chain 120 from nonvolatile storage 112 (until storage 112 is empty). By the time shift register chain 120 is full again, buffer 122 preferably would be ready to receive data again, preferably allowing an uninterrupted flow of data out of nonvolatile storage 112 into shift register chain 120.

However, because encryption of the configuration data may be used to prevent unauthorized interception of the configuration data on connection 130, programming circuit 113 includes a control and decryption block 114 to select the appropriate key or keys and decrypt the configuration data, as described below.

As discussed above, it is desirable to allow different portions of the configuration data to be encrypted separately. For example programming circuit 113 may allow partial reconfiguration of device 100. Thus, in one scenario, an initial configuration may be stored in the nonvolatile configuration storage by the device manufacturer, including certain proprietary configuration data. The purchaser of that device 100 from the device manufacturer could then use the partial reconfiguration feature to add its own proprietary configuration data without destroying or overwriting the device manufacturer's configuration data. Device 100 could then be sold to a further purchaser which could then use the partial reconfiguration feature to add the final programming, without destroying or overwriting the device manufacturer's configuration data or the first purchaser's configuration data, and device 100 could then be incorporated into an end-user product. As an alternative, the device manufacturer could provide its configuration data to the first purchaser on a separate medium and the first purchaser can provide both the manufacturer's configuration data and its own configuration data to the further purchaser on a separate medium. The further purchaser could then input those data from the separate medium into the programming software along with its own programming instructions to create the final configuration. As discussed below, each portion, or partial configuration, can remain separately encrypted.

In another scenario, a first company wants to buy a PLD from a first vendor and some intellectual property core or cores from a second vendor. Either the first vendor or the second vendor sells the devices to the first company. Either way, the devices are sold with a preset nonvolatile key, which may be a "fuse key," set by blowing selected fuses in a fuse array. Regardless of who set the preset key, the second vendor sells the first company a configuration image encrypted with the preset key. The first company does not know the preset key, so the second vendor's configuration image is secure. The first company then generates its own configuration image, as well as a volatile key which it uses to generate an encrypted version of its own configuration image.

The first company then incorporates the device in a final product to be sold to end users, after configuring the device with the second vendor's encrypted configuration image, and then performing a partial reconfiguration to add in the first company's own encrypted configuration image. Both configurations may reside in an on- or off-chip memory device, as described above. Both the first company's proprietary configuration and the second vendor's proprietary configuration remain secure for each of those two companies and from the end users.

These sequences of events are only examples and more or fewer intermediate purchasers and reconfigurations may be possible. In any event, in these examples, some or all of the entities providing configuration data may want to protect those configuration data by encryption. To that end, the partial reconfiguration feature may be designed to allow different partial reconfigurations, including the initial configuration itself (which may be a full or partial configuration in accordance with copending, commonly-assigned Gao et al. U.S. patent application Ser. No. 13/085,679, filed Apr. 13, 2011, which is hereby incorporated by reference herein in its entirety), to be either encrypted or unencrypted. A series of control bits corresponding to each partial reconfiguration (including the initial configuration) identifies whether a particular partial reconfiguration is encrypted or not. Thus, in an example where there are two reconfigurations—the initial configuration and one partial reconfiguration—there may be two control bits as follows (where "POF" stands for the "programmer object file" containing the configuration bitstream):

| Bit Sequence | Initial POF | Partial Reconfiguration POF |
|---|---|---|
| 00 | Unencrypted | Unencrypted |
| 11 | Encrypted | Encrypted |
| 01 | Unencrypted | Encrypted |
| 10 | Encrypted | Unencrypted |
| 0X | Unencrypted | User control |
| 1X | Encrypted | User control |

If there are more partial reconfigurations, then there would be a correspondingly greater number of control bits. In cases listed above as being under "user control," the indication of whether the partial reconfiguration POF is encrypted or not could come from an external signal applied to a device pin, or from the user logic on device 100.

In addition, as described in above-incorporated U.S. Pat. Nos. 5,768,372 and 5,915,017, more than one encryption scheme could be used for the different partial reconfigurations. If so, additional control bits would be provided to indicate which encryption scheme is used for each portion.

Regardless of the number of configurations/reconfigurations and encryption schemes, according to other embodiments of the present invention, a plurality of keys may be provided and used individually or combined. For example, a device 100 according to embodiments of the invention may have three keys—a nonvolatile key, a volatile key, and user-inputted key (also volatile) loaded through the programming port (e.g., JTAG port) of device 100.

The nonvolatile key could be a fuse key—i.e., it could be set by blowing selected fuses in a fuse array—or could be stored in another nonvolatile storage medium. The volatile key may be stored in volatile memory, which preferably has battery back-up.

Whatever the format of the nonvolatile key, it would be particularly well-suited for use by the device manufacturer to protect the manufacturer's own proprietary portion of the configuration data. That would be particularly true of a fuse key implementation. Similarly, the volatile key could be used by the first purchaser, while the loadable key could be used by the second purchaser who, in the three-configuration example above, provides the final configuration for an end-user product (the end-user does not provide any configuration).

Figure 2:
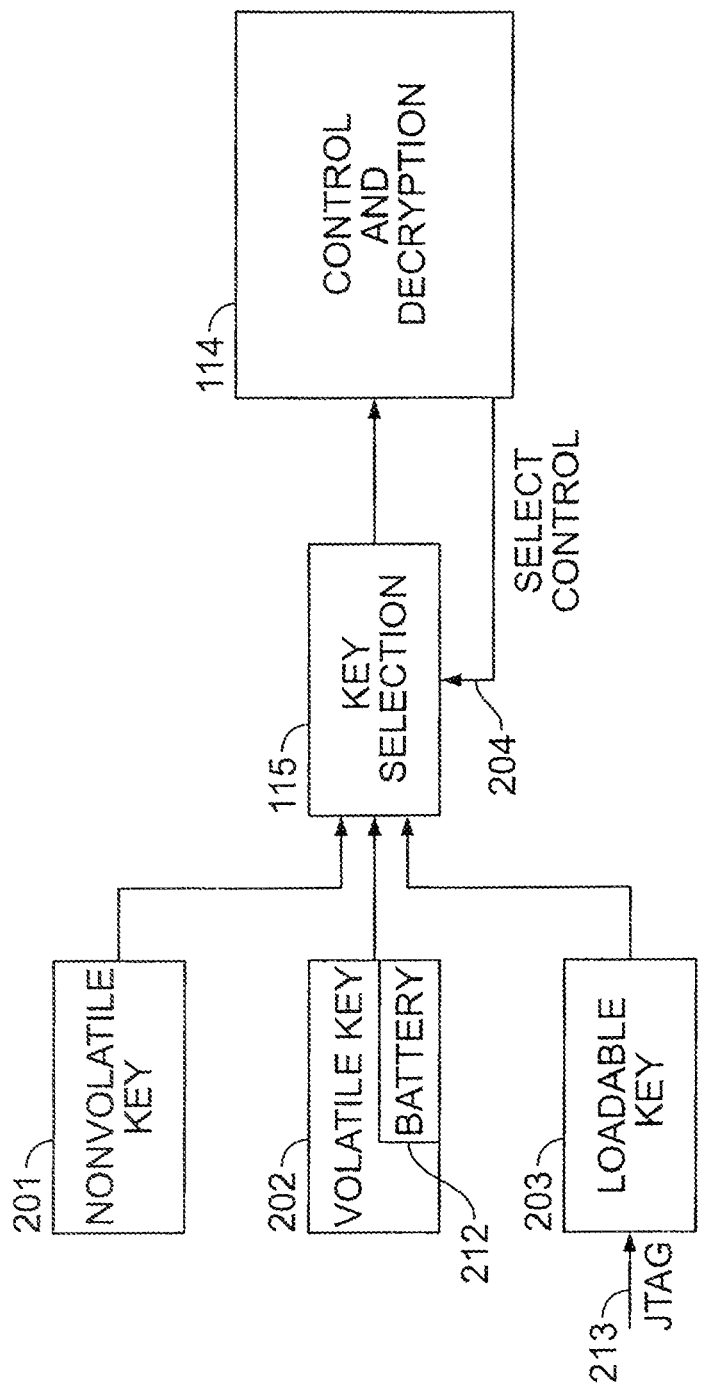
FIG. 2 is a block diagram of key selection circuitry according to an implementation of the present invention.

Key selection could be facilitated in one implementation by providing a key selection circuit 115 under control of control and decryption block 114, as shown in FIG. 1 and in more detail in FIG. 2. As seen in FIG. 2, control and decryption block 114 has access to nonvolatile key storage 201, volatile key storage 202 (which may include battery back-up 212), and loadable key storage 203. Alternatively, control and decryption block 114 may be connected directly to the JTAG or similar port 213 for capture of the loadable key. Control and decryption block 114, which would "know," based on control bits in the configuration/reconfiguration being loaded which key was required, would generate a key selection signal 204 which would instruct key selection circuit 115 to select the appropriate one of the three keys 201, 202, 203 to allow decryption of the configuration/reconfiguration being loaded. Those control bits would be expected to be clear data; otherwise, they could not be read until the decryption had occurred.

In the implementation just described, where the individual keys are associated with separate configurations/reconfigurations, key selection circuit 115 could be a simple n:1 multiplexer (in the specific example given, n=3). However, there could be other implementations in which the various keys 201, 202, 203 are combined—in the same or different ways—for loading various ones of the configuration data portions. In such an implementation, key selection circuit 115 would include the appropriate logic to implement the various combinations that may be called for by signal 204. A simple implementation would call for concatenating two or more of the keys 201, 202, 203 in a specified order. Another relatively simple implementation would call for combining two or more of the keys 201, 202, 203 by a simple logical operation—e.g., an exclusive-OR operation.

It should be noted that while implementations have been described that include three keys, any number of keys could be provided and could be used individually or combined in different ways, as described.

Figure 3:
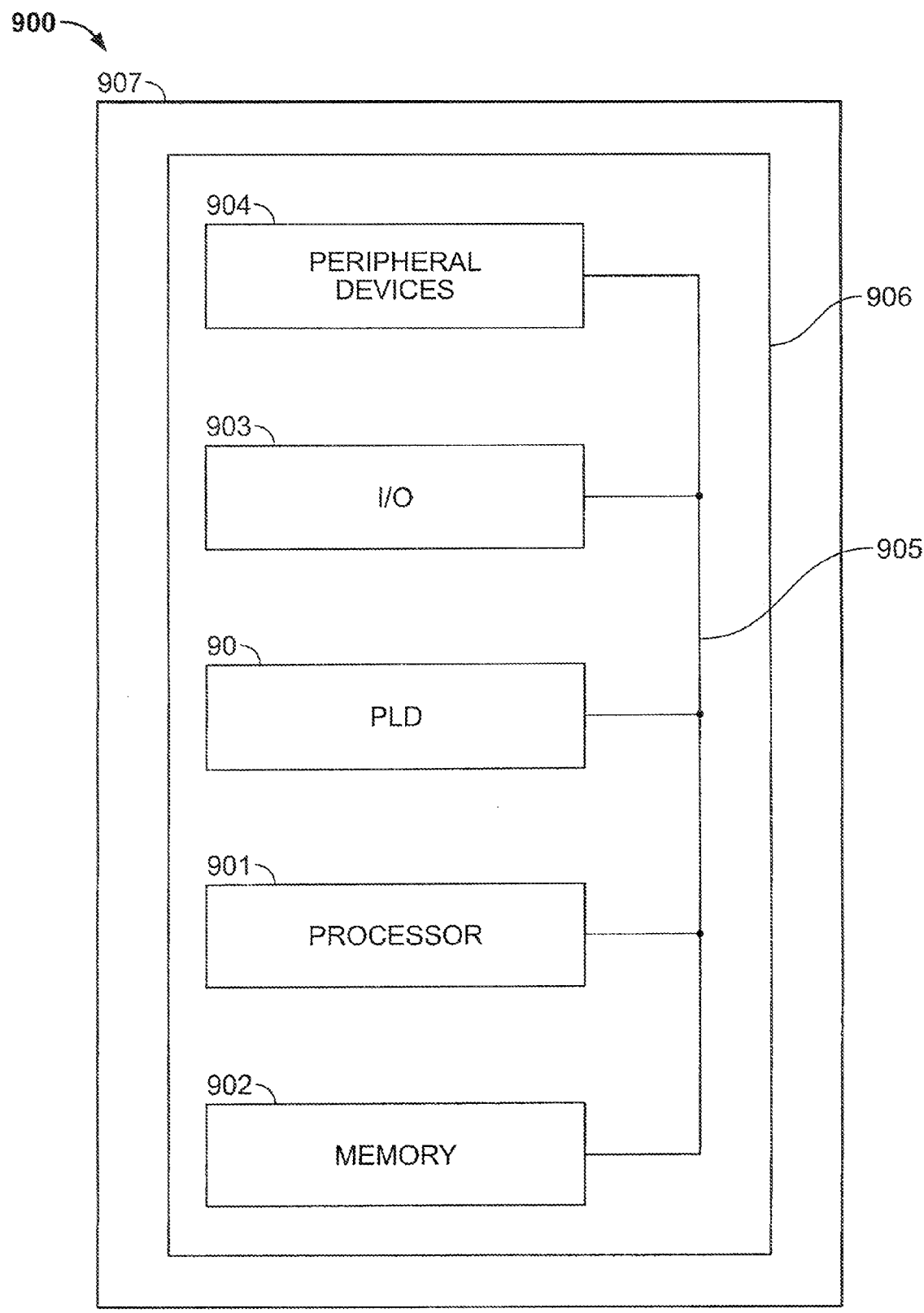
FIG. 3 is a simplified block diagram of an illustrative system employing a programmable logic device incorporating the present invention.

A PLD 90 programmed according to any embodiment of the present invention may be used in many kinds of electronic devices. One possible use is in a data processing system 900 shown in FIG. 3. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A programmable integrated circuit device comprising:
   an input for configuration data for said programmable integrated circuit device, wherein said programmable integrated circuit device is partially reconfigurable by writing into said input, in different operations at different times, a first portion of configuration data and at least one respective additional portion of configuration data, said first portion of configuration data being at least partially encrypted according to a first encryption scheme, and said at least one respective additional portion of configuration data being at least partially encrypted according to a respective at least one additional encryption scheme different from said first encryption scheme;
   a plurality of key stores that store a plurality of respective keys for at least said first encryption scheme and said respective at least one additional encryption scheme;
   control circuitry that identifies required keys from said at least partially encrypted first portion of configuration data and said at least partially encrypted at least one respective additional portion of configuration data, and generates respective key selection signals; and
   key selection circuitry responsive to said respective key selection signals, that reads said plurality of key stores and provides said required keys to said control circuitry; wherein:

said control circuitry includes decryption circuitry that decrypts said at least partially encrypted first portion of configuration data and said at least partially encrypted at least one respective additional portion of configuration data using respective ones of said required keys.

2. The programmable integrated circuit device of claim 1 wherein said key selection circuitry selects said required keys from respective ones of said plurality of key stores.

3. The programmable integrated circuit device of claim 2 wherein said key selection circuitry comprises a multiplexer having, as inputs, outputs of said plurality of key stores, and a respective output for each of said required keys.

4. The programmable integrated circuit device of claim 1 wherein said key selection circuitry reads at least two of said stored keys from said plurality of key stores and generates at least one of said required keys from at least two of said stored keys.

5. The programmable integrated circuit device of claim 4 wherein:
said key selection circuitry comprises an exclusive-OR gate; and
said key selection circuitry generates said at least one of said required keys by inputting said at least two of said stored keys into said exclusive-OR gate to perform an exclusive-OR function on said at least two of said stored keys.

6. The programmable integrated circuit device of claim 1 further comprising:
configuration data storage that stores said configuration data and provides said configuration data to said input; wherein:
said configuration data storage stores said respective ones of said first portion of configuration data and said at least one respective additional portion of configuration data in their respective encrypted forms.

7. The programmable integrated circuit device of claim 1 wherein said plurality of keys comprise:
a nonvolatile key;
a volatile key; and
a loadable key.

8. The programmable integrated circuit device of claim 7 wherein said nonvolatile key is a fuse key.

9. The programmable integrated circuit device of claim 7 further comprising battery back-up for said volatile key.

10. The programmable integrated circuit device of claim 1, wherein:
said programmable integrated circuit device comprises a programmable logic core; and
said control circuitry provides decrypted configuration data via said input to said programmable logic core.

11. The programmable integrated circuit device of claim 10 further comprising configuration data storage that stores said configuration data and provides said configuration data to said input.

12. The programmable integrated circuit device of claim 10 wherein said programmable logic core is a field-programmable gate array.

13. A programmable integrated circuit device comprising:
control circuitry;
a plurality of key stores that store a plurality of keys;
key selection circuitry; and
an input for configuration data for said programmable integrated circuit device, said configuration data including a plurality of partial configuration data portions; wherein:
each one of said partial configuration data portions after an initial one of said partial configuration data portion is input as a reconfiguration of a previous partial configuration;
respective ones of said plurality of partial configuration data portions are encrypted and require respective keys;
said control circuitry identifies respective required keys from control data in said configuration data and generates respective key selection signals; and
said key selection circuitry reads said plurality of key stores responsive to said respective key selection signal and provides said respective required keys to said control circuitry.

14. The programmable integrated circuit device of claim 13 wherein said plurality of keys comprise:
a nonvolatile key;
a volatile key; and
a loadable key.

15. The programmable integrated circuit device of claim 14 wherein said nonvolatile key is a fuse key.

16. The programmable integrated circuit device of claim 14 further comprising battery back-up for said volatile key.

17. The programmable integrated circuit device of claim 13, wherein:
said programmable integrated circuit device comprises a programmable logic core; and
said control circuitry provides decrypted configuration data via said input to said programmable logic core.

18. The programmable integrated circuit device of claim 17 further comprising configuration data storage that stores said configuration data and provides said configuration data to said input.

19. The programmable integrated circuit device of claim 17 wherein said programmable logic core is a field-programmable gate array.

20. A method of configuring a programmable integrated circuit device comprising:
storing a first portion of partial configuration data for said programmable integrated circuit device, and at least one respective additional portion of partial configuration data for reconfiguring said programmable integrated circuit device as configured by said first portion of partial configuration data, in nonvolatile storage, said first portion of partial configuration data being at least partially encrypted according to a first encryption scheme, and each of said at least one respective additional portion of configuration data being at least partially encrypted according to a respective at least one additional encryption scheme different from said first encryption scheme; and
storing a plurality of respective keys for at least said first encryption scheme and said respective at least one additional encryption scheme in respective ones of a plurality of key stores on said programmable integrated circuit device.

21. The method of claim 20 wherein said plurality of respective keys comprises one of:
a nonvolatile key;
a volatile key; and
a loadable key.

22. The method of claim 21 wherein:
at least one key in said plurality of respective keys is a nonvolatile key; and
said nonvolatile key is a fuse key.

* * * * *